Patented Nov. 9, 1948

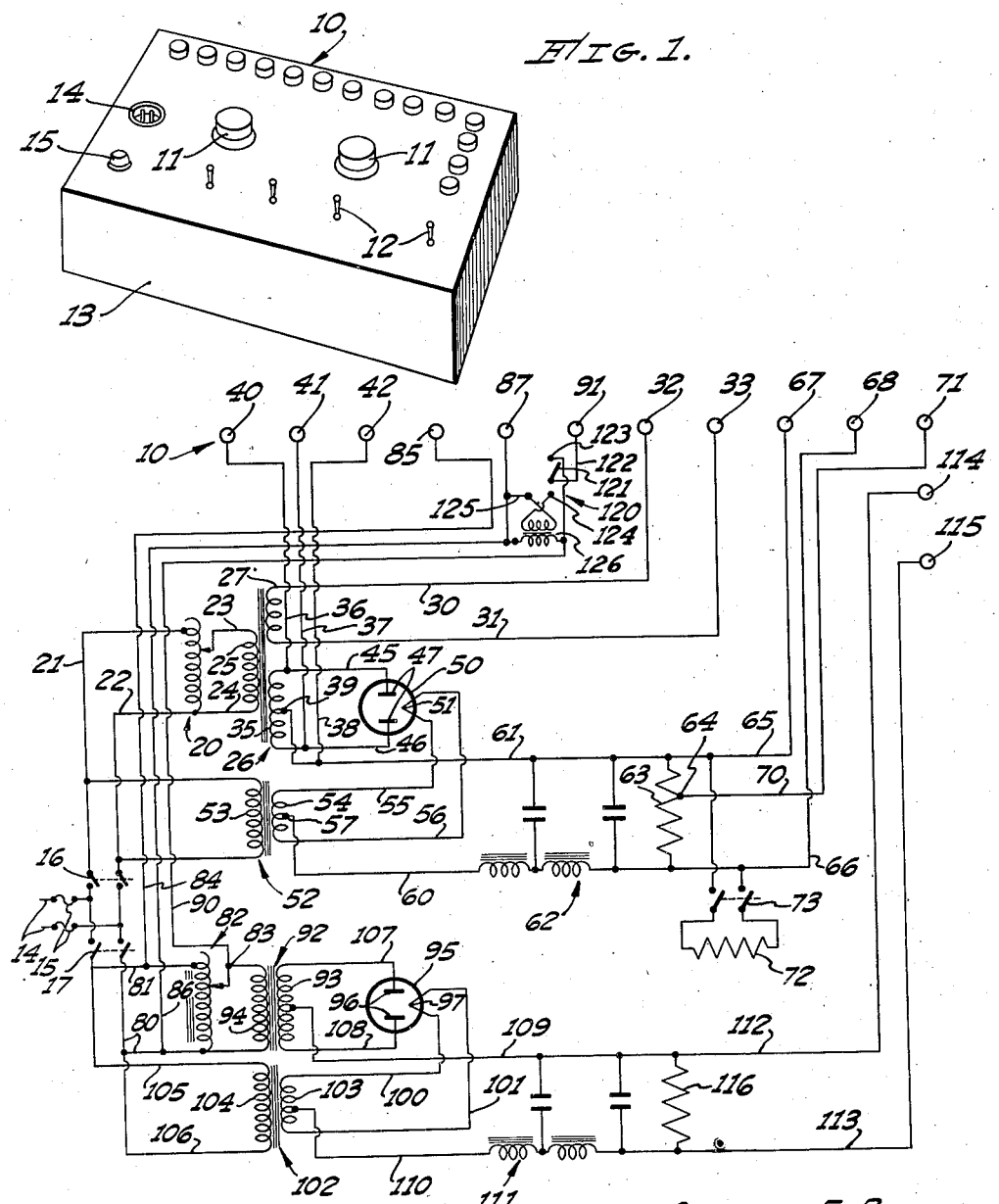

2,453,191

UNITED STATES PATENT OFFICE 2,453,191

METER TESTING DEVICE

Arthur E. Booth, Los Angeles, Calif.

Application October 14, 1946, Serial No. 703,119

2 Claims. (Cl. 175—183)

This invention relates generally to devices for testing electric meters and instruments and more particularly to devices for use by public utilities and similar concerns where a larger number of such devices are constantly being calibrated and checked against a standard.

In the operation of public utilities, it is necessary that the various meters and instruments used in the generation and transmission of power be accurate. As a result, most utilities have a regular schedule for removing and testing the meters, comparing them with a secondary standard or bench meter which in turn is calibrated against a very accurate primary standard. However, the operating meter or instrument must be checked over a relatively wide range of operating conditions, rather than a single designated point, and consequently the operating conditions of both the standard and operating instrument must be simultaneously varied. Furthermore, a large variety of instruments must be tested, including volt meters, ammeters, watt meters, and power factor meters. The calibration of volt meters and ammeters is rather simple, but the calibration of watt meters, and power factor meters requires more elaborate testing equipment. In the calibration of power factor meters, for example, it is necessary to provide two voltages, one of which is maintained substantially constant while the other voltage is varied in phase or magnitude with respect to the first voltage. Heretofore, this has been done by the use of rotating machinery which is large, expensive, and cumbersome. By using the testing device about to be described, however, the need for the rotating equipment is eliminated, and these tests and others may be quickly and easily performed with a small amount of equipment occupying much less space and more easily controlled.

It is therefore the major object of this invention to provide a device for the checking of meters and instruments against a standard.

Another object of the invention is to provide such a device which occupies a minimum of space and requires very little power.

It is a further object of the invention to provide a device of this type in which the majority of routine checks upon meters and instruments may be performed with a few simple adjustments, the checks being made over the useful range of the instrument rather than at a single point on a scale.

Still another object of the invention is to provide a device which may be used in the checking of relays, both alternating and direct current operated, as well as the checking of meters and instruments.

It is a still further object of the invention to provide such a device which is relatively light in weight and much less expensive to manufacture than previously available instruments performing comparable work.

These and other objects and advantages of the invention will become apparent from the following description of a preferred form thereof, and from the drawings illustrating that form, in which:

Fig. 1 is a perspective view of the assembled meter tester as it may be mounted in a case; and Fig. 2 is a schematic wiring diagram of the device shown in Fig. 1.

Referring now to the drawings and particularly to Fig. 1 thereof, it will be seen that the device includes a series of connectors or terminals 10, controls 11 to vary the voltages appearing at certain of the connectors, and switch handles 12 which are adapted to control the energization of certain sections of the equipment. While under certain circumstances it may be desirable to install this equipment permanently in a test bench, at other times it is preferable to have the device semi-portable; consequently it has been shown here as enclosed in a cabinet 13, provided with a suitable connector 14 adapted to be connected to a source of power, and protected by a fuse 15. While various forms of cabinets may be used, it has been found that some form of light weight cabinet is very desirable if any testing is to be done where the meter or relay is installed.

As shown in the schematic wiring diagram of Fig. 2, the connector 14 is connected through fuses 15 to a pair of switches 16 and 17, the first of which controls the energization of some of the components of the device, and to the second of which controls the energization of the remainder. Among the components controlled by switch 16 is a variable transformer 20 whose output voltage may be varied by rotating a control shaft. Such transformers are commercially available under various trade names, such as "Variao," and usually consist of an auto-transformer with an output tap which may be adjusted by rotating the shaft. As shown in Fig. 2, the input connections of the variable transformer 20 are connected by conductors 21 and 22 to the terminals of switch 16, and the output terminals are connected by conductors 23 and 24 to the primary winding 25 of a second transformer 26. Transformer 26 has a plurality of secondary windings, one of which, 27, is a relatively low voltage, high-current capacity winding whose terminals are connected by conductors 30 and 31 to terminals 32 and 33 respectively. These terminals thus provide a source of low voltage current for use in testing meters; and by varying the adjustment of transformer 20, the flow of current may be controlled as desired.

To provide a supply of higher voltage, transformer 26 is also provided with a center-tapped secondary winding 35 whose end terminals are connected by conductors 36 and 37 to terminals 40 and 41 and whose center tap 39 is connected by conductor 38 to terminal 42. The voltage appearing between terminals 40 and 41 will be the full voltage appearing between the ends of the secondary winding 35, while the voltage appearing between terminal 42 and either terminal 40 or 41 will be half of that voltage. Since secondary 35, like secondary 27, is controlled by the variable transformer 20, the voltage appearing between any two of the terminals 40, 41 and 42 may be controlled by adjusting the variable transformer. All of the voltages, however, rise and fall together, and thus if the voltage appearing between terminals 40 and 41 is reduced to one-half of its original value by adjustment of variable transformer 20, the voltage appearing between terminals 40 and 42 will likewise be reduced to one-half its original value. By way of example only and not as a limitation, it has often been found desirable to construct transformers 20 and 26 so that the voltage appearing between terminals 40 and 41 may be varied from zero to 800 volts, while the voltage appearing between terminals 40 and 42 may be varied between zero and 400 volts.

To provide direct current for use in testing direct current meters and instruments and also for testing relays, should that be necessary, the output of secondary winding 35 is connected to a rectifier, of which many suitable types are available. While the connections may vary slightly with the type of rectifier used, it is generally preferable to use a so-called vacuum tube 50, having a cathode 51 and a pair of anodes 47, and to connect the latter to the end terminals of secondary winding 35 by conductors 45 and 46. Power to operate the cathode 51 is obtained from a separate transformer 52 whose primary 53 is connected to conductors 21 and 22 so that it is energized by closing of switch 16, and whose secondary winding 54 is connected by conductors 55 and 56 to the cathode. Secondary winding 54 is provided with a center tap 57 which forms one side of the direct-current circuit; and it, and center tap 39 are connected by conductors 60 and 61 respectively to a filter circuit 62 of the choke-input, condenser-output type to provide a direct-current output which has substantially no ripple or alternating components. Across the output terminals of the filter circuit is a voltage divider comprising a resistor 63 having a tap 64 which is at a potential intermediate that of its ends. The ends of resistor 63 are connected by conductors 65 and 66 to terminals 67 and 68 respectively, while tap 64 is connected by conductor 70 to terminal 71. The resistor 63 thus provides a continuous load for the rectifier 50, and tap 64 permits an intermediate voltage less than that appearing between terminals 67 and 68 to be selected.

It should be noted that the transformer 52 is energized directly from the connector 14 through switch 16 without any intermediate variable control and therefore, cathode 51 is always operated under standard conditions when switch 16 is closed. However, secondary 35 of transformer 26 is connected through variable transformer 20, and the voltage applied to anodes 47 may therefore be controlled. As a result, the direct-current voltage appearing between conductors 60 and 61 may be varied by changing the adjustment of variable transformer 20, thereby changing the voltage between terminals 67 and 68; and the voltage between terminals 67 and 71 is, of course, likewise changed in the same proportion. However, when a more accurate control of the lower voltages is desired, a resistor 72 may be connected in parallel with the resistor 63 by closing switch 73. When this switch is closed, resistor 72 provides an additional load in the output circuit of the vacuum tube 50, thereby lowering the voltage appearing between the terminals 67 and 68, to leave the same amount of angular movement of the shaft of variable transformer 20 to control a smaller range of voltage. As a result, a more accurate control of the lower voltages is obtainable. By way of example only, it has been found desirable in many instances to provide components of the circuit which will furnish a voltage range of zero to 400 volts between terminals 67 and 68 when switch 73 is open, with a voltage range of zero to 100 volts between terminals 67 and 71.

The remaining component parts of the device are controlled by switch 17 whose terminals are connected by conductors 80 and 81 to a second variable transformer 82, similar to variable transformer 20, and having a variable output terminal 83. Since the transformer shown is of the auto-transformer type, the other or non-variable output terminal is normally considered to be the same as that to which conductor 80 is connected; and by adjusting the control shaft of the transformer, the voltage appearing between terminal 83 and conductor 80, and also the voltage appearing between terminal 83 and conductor 81, may be varied. This feature is utilized in certain power factor tests hereinafter described. To render these voltages readily available, conductor 81 is connected by conductor 84 to terminal 85, and conductor 80 and terminal 83 are connected to terminals 87 and 91. In certain testing of power factor meters, it is desirable to reverse the phase of the voltage appearing between terminals 87 and 91 without affecting the voltage appearing between terminals 85 and 87. To do this, a single pole double throw switch 120 is provided having a movable contact 121 which is connected by conductor 122 to terminal 91. The movable contact 121 is adapted to complete a circuit either to a fixed contact 123 which is connected by conductor 90 to terminal 83, or to a fixed contact 124. The latter is connected to one terminal of the secondary of an isolation transformer 126, the other terminal of which is connected to terminal 87 by conductors 125 and 86. This transformer 126 has a one-to-one ratio so that there is no voltage change through it, and its primary winding is connected to conductors 86 and 90, while its secondary is connected so that there is a reversal of phase in the voltage appearing between terminals 87 and 91 when movable contact 121 is moved from fixed contact 123 to fixed contact 124. The voltage between terminals 85 and 87 thus remains constant and the voltage between terminals 87 and 91 may be varied by adjusting the transformer 82, from zero to a voltage equal to or slightly above that appearing between terminals 85 and 87.

It will be noted that the control of these voltages is independent of the adjustment of variable transformer 20; and conversely, the control of the voltages appearing between terminals connected to transformer 26 has no effect upon the voltages appearing between terminals 85, 87 and 91. Similarly, the operation of variable transformer 82 is independent of the position of switch 16, while the operation of variable transformer 20 is independent of the position of switch 17. Consequently, to facilitate the use of the test device it has been found advisable to align the control handle for switch 17 with the control knob for variable transformer 82, align the control handle for switch 16 with the control knob of variable transformer 20, and place the control handle for switch 120 between the others. Similarly, since switch 73 controls the direct current output, it may logically be placed to one side where it is substantially aligned with terminals 67, 68 and 71. This is indicated in Fig. 1 where the left hand control knob 11 controls the variable transformer 20, and its energization is controlled by the left hand switch handle 12 which operates switch 16. Similarly, the right hand control knob 11 controls the operation of variable transformer 82, and is aligned with the switch handle 12 which operates the associated switch 17. The facilitate the use of this device, the legends of the terminals 10 controlled by switch 16 may be in one color, while the legends of the terminals controlled by switch 17 may be in a different color. Thus, terminals 40, 41, 42, 32, 33, 67, 68 and 71 might have adjacent legends in white, while terminals 85, 87 and 91 might be red. The graduations of the controls 11 and the legends of switch levers 12 may be similarly colored so that it may be readily apparent which controls and terminals are associated.

To increase the versatility and usefulness of the device, variable transformer 82 may be used to provide a supply of direct current independent of that furnished by variable transformer 20. As shown in the wiring diagram, conductor 80 and terminal 83, constituting the output terminals of variable transformer 82, may be connected to a primary winding 94 of a transformer 92 having a center tapped secondary winding 93. A vacuum tube 95, similar to vacuum tube 50, and having anodes 96 and a cathode 97, has the terminals of the latter connected by conductors 100 and 101 to the end terminals of a center-tapped secondary winding 103 of a transformer 102. The latter has a primary winding 104 whose terminals are connected by conductors 105 and 106 to the terminals of switch 17 so that it is energized whenever the switch is closed and cathode 97 is thereby heated. The end terminals of secondary 93 of transformer 92 are connected by conductors 107 and 108 to anodes 96 of vacuum tube 95; and the center tap of that winding is connected to conductor 109 which, with conductor 110 connected to the center tap of secondary 103 of transformer 102, forms the direct-current output circuit. Conductors 109 and 110 are connected to a two-section choke-input, condenser-output filter circuit 111 similar to filter circuit 62, and the output from the filter circuit is connected by conductors 112 and 113 to terminals 114 and 115 respectively. The proper output impedance may be obtained by connecting a resistor 116 between conductors 112 and 113, and the voltage appearing between terminals 114 and 115 may be adjusted by varying the variable transformer 82. The legend of these terminals, in accordance with the previous discussion, would be marked in red to indicate that they are controlled by switch 17 and variable transformer 82.

Since the direct current provided at terminals 114 and 115 is entirely separate and independent from that provided at terminals 67, 68 and 71, these two sets of terminals may be connected in series if a higher voltage is required than is obtainable by the use of either direct current circuit alone. Similarly, by adjusting the corresponding transformers so that the two sets of terminals provide equal voltages, they may be connected in parallel when the current demands of the load are greater than can be handled by either circuit alone.

While obviously the size and capacity of certain of the components will be largely determined by the size and capacity of certain other components, it has been found that if secondary winding 35 of transformer 26 is adapted to provide approximately 800 volts between its end terminals when primary 25 is energized at 135 volts, satisfactory results will be obtained if the following values are used:

Capacitors, in filter circuit 62, 8 to 16 mfds. each.
Choke coils, in filter circuit 62, 5 to 25 henries each.
Resistor 63, 20,000 ohms.
Resistor 72, 10,000 ohms.
Vacuum tube 50, 80, 83, 5Z3, 5R4GY.

Similar values may be used in the direct current circuit energized by switch 17 with equally good results, and it is believed that their application will be obvious.

*Operation*

In the use of this meter tester, connector 14 is connected to a suitable source of power, and switches 16 and 17 are left open until the desired connections have been made to the terminals 10. It is obviously not practical to give detailed instructions as to the method of checking each kind of meter and relay which may be tested by this device, but the following examples should provide sufficient information to indicate how other types may be tested.

Assuming first that an A.-C. volt meter is to be checked against a standard A.-C. volt meter, the two meters are connected in parallel and to terminals 40 and 41, 40 and 42, 85 and 91, or 87 and 91. The particular terminals which are selected will be determined by the voltage range of the meters, since a range of 800 volts is available between terminals 40 and 41, while a range of 400 volts is obtainable between terminals 41 and 42 and between terminals 40 and 42. Similarly, a range of 120 volts is available between terminals 85 and 91, and a range of 135 volts is available between terminals 87 and 91, all of these ranges being from zero to the indicated value. If a volt meter having a range of zero to 250 volts is to be tested, it would normally be connected between terminals 40 and 42 or 41 and 42, and the standard meter would be connected in parallel with it. Switch 16 is then closed, and variable transformer 20 is operated to provide a range of voltages within the capacity of the meter so that the test meter may be compared to the standard meter. The capacity of transformers 20 and 26 is such that they are able to supply an ample amount of current without excessive voltage drop for almost all meters which are encountered in public utility work.

Since both meters are subjected to the identical voltage, any deviation of the indicated reading of the test meter from that of the standard meter shows an inaccuracy in the test meter which will be noted in the tabulation of corrections.

If an A.-C. ammeter is to be checked against a standard ammeter, the two meters are connected in series and to terminals 32 and 33. When switch 16 is then closed, the current through the meters may be varied by adjusting variable transformer 20; and since both meters are connected in series, the current flow through each of them is the same as that through the other. Consequently, the readings should be the same at all times, and any variation will be noted in the correction chart.

When a single-phase wattmeter is to be tested, its current coil is connected in series with the current coil of the standard wattmeter and the terminals 32 and 33, while the voltage coils of the standard and test meters are connected in parallel and to terminals 85 and 87, with switch 120 thrown to disconnect the secondary of the isolation transformer 126 from the circuit. Both switches 16 and 17 are then closed, and the voltage appearing between terminals 85 and 87 is equal to the rated voltage of the meter or its normal operating voltage, assuming a 100-120 volt meter. Variable transformer 20 is then adjusted to provide a series of current values within the range of the meters so that a series of readings may be made.

To test the accuracy of a power factor meter, the current coils of the standard and test meters are connected in series and to terminals 32 and 33, while the potential coils are connected in parallel and to terminals 85, 87 and 91. Phase A of the potential circuit is connected to terminal 85; phase B is connected to terminal 87; and phase C is connected to terminal 91. Switch 120 is thrown to disconnect terminal 91 from the secondary of transformer 126 and connect the terminal directly to conductor 90, switches 16 and 17 are then closed, and variable transformer 20 is adjusted until the current in the series circuit is equal to the normal rated current of the instruments, normally 5 amperes. By then varying the control of variable transformer 82, the voltage of terminal 91 is changed with respect to terminals 85 and 87 and this produces an indication of leading or lagging power factor. When the potentials at terminals 85 and 91 are equal, the meter should indicate unity power factor, and as mentioned, the decrease in voltage appearing at terminal 91 will indicate a lowering power factor. Usually the range of power factor indications produced in this manner is sufficient, but if a power factor below 50% is to be indicated, the switch 120 is thrown, and values much lower may be secured. When the test meter has been calibrated for either leading or lagging power factor, as the case may be, the calibration of the other type of power factor may be made by interchanging the connections to terminals 85 and 87 and again varying the control of variable transformer 82. In this way, a complete calibration of a power factor meter may be made without the use of any rotating machinery and with a minimum of time and effort.

It will be apparent that other alternating current meters may be checked in a similar manner, having regard for the particular function and internal connections of the meter being tested. Direct-current volt meters, millivoltmeters, milliammeters, and microammeters may be tested by connecting them between terminals 67 and 68 or between terminals 67 and 71, depending upon the range of the meter, or they may be similarly tested by connecting them between terminals 114 and 115. As previously mentioned, by connecting terminal 67 to terminal 114, and connecting terminal 68 to terminal 115, the two independent sources of direct current are connected in parallel so that a greater current range is available.

Both alternating-current and direct-current relays may be calibrated and adjusted by using this device, the relay being connected to the appropriate terminal and the voltage and current conditions adjusted by means of the variable transformers 20 and 82 so that proper operating conditions are obtained. The current and voltage capacities of the various components of the device are sufficient to operate all generally available commercial instruments without overloading any of the equipment and without destroying the accuracy of any of the previously made adjustments. In this connection, it should be noted that transformer 26 is provided with a separate secondary winding 27 which is used to supply the relatively low voltage, high current necessary for some of the tests, and thus the other secondary 35 will not be overloaded and its voltage reduced when there is a relatively heavy current drain. Similarly, it will be noted that the cathodes 51 and 97 of vacuum tubes 50 and 95 respectively are energized by separate transformers 52 and 102 which are not connected to the output terminals of the variable transformers 20 and 82. Thus, as the variable transformers are adjusted, the voltage and current conditions of the cathodes remain unchanged to provide the optimum operating conditions.

It will be apparent that modifications may be made in this device without departing from the scope of the invention as defined herein, and the latter is not to be limited to the particular form or arrangement of parts herein described and shown except as covered by the claims.

I claim:

1. A testing device of the type described which includes: a variable transformer adapted to be connected to a source of alternating current; a multiple secondary transformer connected to the output of said variable transformer, said multiple secondary transformer having a relatively high-voltage low-current secondary winding, and a relatively low-voltage high-current secondary winding, the outputs of said secondary windings being controlled by the adjustment of said variable transformer; means connecting said secondary windings to terminals to which electrical apparatus may be connected for testing; a second variable transformer having an input connection, a common input and output connection, and an output connection, adapted to be connected to a source of alternating current so that its output may be controlled independently of the output of said first variable transformer; and means connecting said input, common, and output connections to separate terminals, whereby a power factor meter may be tested by connecting it to said last mentioned terminals and said terminals connected to said low-voltage, high-current secondary winding and varying the controller of said second variable transformer, and whereby a wattmeter may be tested by connecting it to said common and said output connection and to said terminals connected to said low-voltage, high-current secondary winding, and varying the controller of one of said variable transformers.

2. A device as described in claim 1 in which an isolation transformer is connected to said means connecting said common and output connections to said terminals, said transformer being connected to said terminals to reverse the phase of the voltage appearing therebetween, and switch means operable to connect said transformer to change the phase of said voltage from normal to reverse.

ARTHUR E. BOOTH.

REFERENCES CITED

The following references are of record in the file of this patent:

UNITED STATES PATENTS

| Number | Name | Date |
| --- | --- | --- |
| 950,714 | Blakeslee | Mar. 1, 1910 |
| 2,205,309 | Riordan | June 18, 1940 |

OTHER REFERENCES

MacGahen, "Calibration Method for Electrodynamic Power Factor Meters," in Power Plant Engineering, October 1945, pages 87 and 94.